United States Patent [19]

Tschirner

[11] 4,455,727
[45] Jun. 26, 1984

[54] FRICTION-DRIVEN ROLL FOR TREATING WEB-LIKE INTERMEDIATE PRODUCTS BY COMPRESSION

[75] Inventor: Wolfgang Tschirner, Tönisvorst, Fed. Rep. of Germany

[73] Assignee: Kleinewefers, Jaeggli Textilmaschinen AG, Switzerland, Fed. Rep. of Germany

[21] Appl. No.: 344,044

[22] Filed: Jan. 29, 1982

[30] Foreign Application Priority Data

Feb. 13, 1981 [DE] Fed. Rep. of Germany ....... 3105171

[51] Int. Cl.$^3$ .................................. B21B 31/00
[52] U.S. Cl. .......................... 29/113 R; 29/116 AD
[58] Field of Search ...... 29/113 AD, 116 AD, 113 R, 29/116 R, 148.4 D

[56] References Cited

U.S. PATENT DOCUMENTS

| 3,706,119 | 12/1972 | Collet | 29/113 R |
| 4,035,038 | 7/1977 | Hinchcliffe | 29/116 R X |
| 4,089,094 | 5/1978 | Kaira | 29/116 AD |
| 4,262,400 | 4/1981 | Miesch | 29/116 AD |
| 4,357,743 | 11/1982 | Hefter et al. | 29/116 AD |

FOREIGN PATENT DOCUMENTS

| 893426 | 4/1962 | United Kingdom | 29/113 AD |
| 1135901 | 12/1968 | United Kingdom | . |

Primary Examiner—Howard N. Goldberg
Assistant Examiner—Carl J. Arbes
Attorney, Agent, or Firm—McGlew and Tuttle

[57] ABSTRACT

A friction-driven roll comprises a stationary roll core with a supporting tube disposed over the roll core and a jacket tube rotatably mounted on the supporting tube. A plurality of elastic distension bodies are disposed between the roll core and the supporting tube and anti-friction bearings are arranged between the supporting tube and the jacket tube. The supporting tube comprises a plurality of link sleeves arranged end to end with a joint therebetween and with a coupling sleeve embracing each two embracing link sleeves and the joints therebetween. The distension bodies comprise hollow fluid pressure cushions which are connected individually to fluid pressure supply.

11 Claims, 5 Drawing Figures

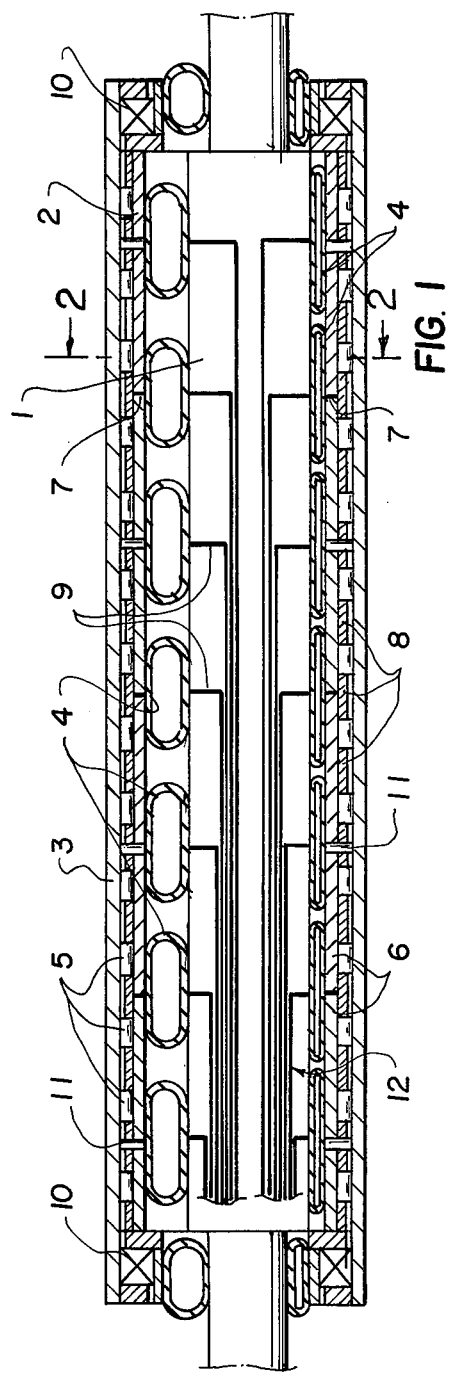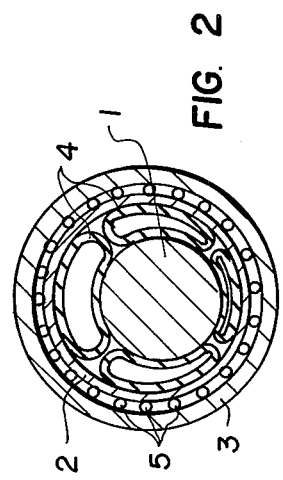

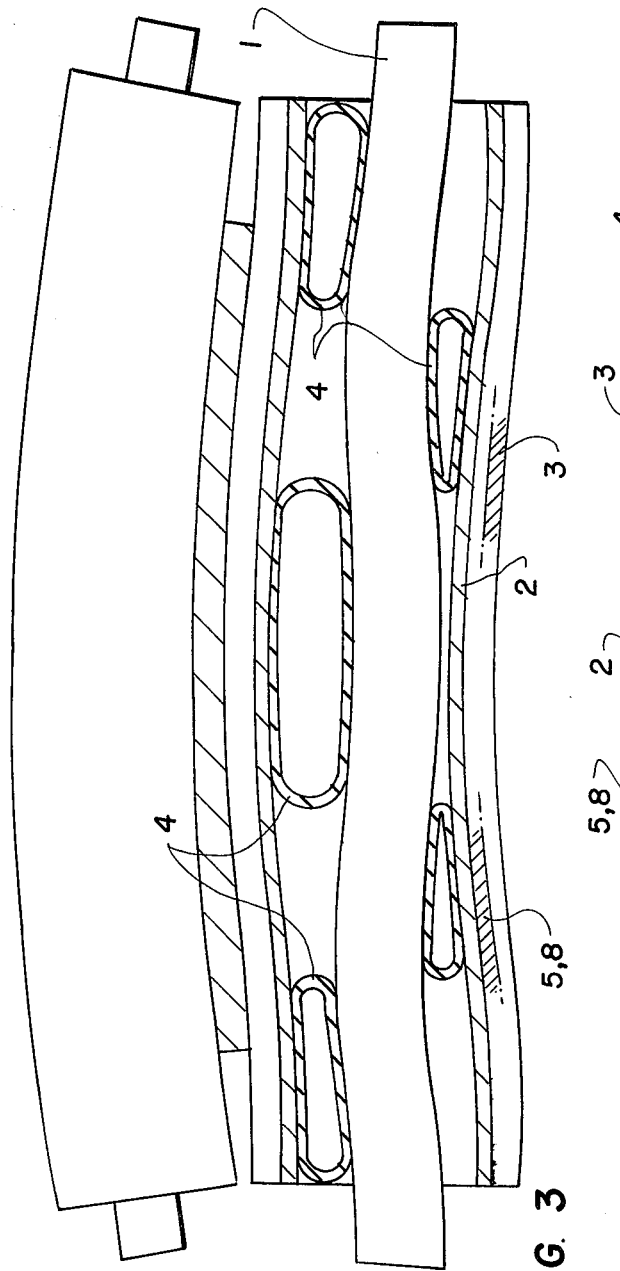
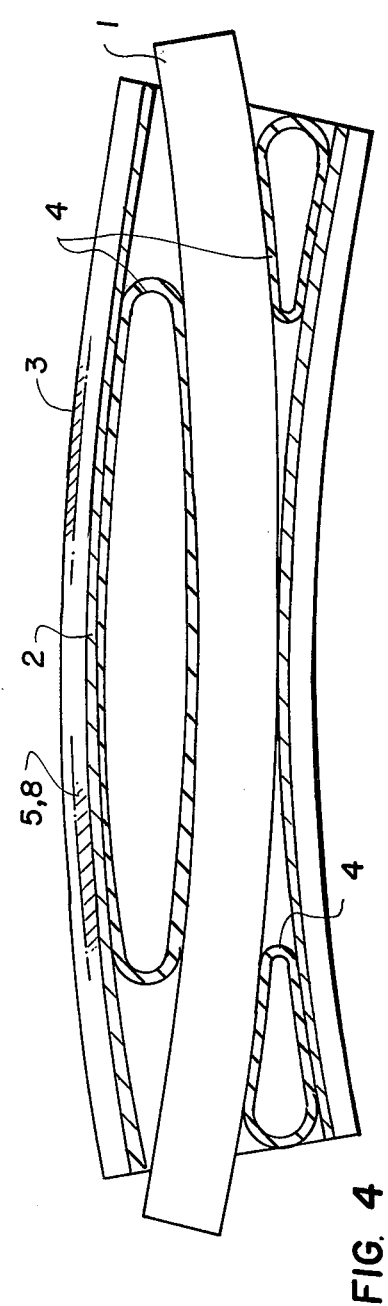
FIG. 3
FIG. 4

FRICTION-DRIVEN ROLL FOR TREATING WEB-LIKE INTERMEDIATE PRODUCTS BY COMPRESSION

FIELD AND BACKGROUND OF THE INVENTION

This invention relates in general to construction of rollers and in particular to a friction-driven roll having a supporting tube which is made up of a plurality of link sleeve members which is supported on a stationary core by means of a plurality of distension bodies.

Within the context of the present application, it is understood that a friction-driven roll is a roll which is not rotated by a drive of its own and is associated with a counter-roll or both. Such rolls are employed as gap pressure producing rolls, belt controlling rolls, curved spreader rolls, etc., for example in mangles, squeezers, calenders, printing machines, or paper making machines.

Known is a friction-driven roll in which only one distension body is provided between the stationary roll core and the supporting tube, at the side close to and remote from the counter-roll, respectively. Both these distension bodies embrace the roll core only in the respective diametrically opposite regions, and exend over the entire length of the core, without any subdivision. The distension bodies can be pressurized or depressurized by means of a fluid, to either press the jacket tube against the counter-roll, or lift it therefrom. The jacket tube forming the circumference of the roll is mounted on a supporting tube by means of circular bearings provided at spaced-apart locations.

Preferably, the jacket tube is supported at two locations only. In consequence, there is a risk of flection if a weblike sheet or strip is passed through the roll gap under pressure. The pressure is then distributed non-uniformly. In general, a uniform pressure distribution in the roll gap is required while treating such webs in manufacture. A flection of such prior art friction-driven roll cannot be corrected.

Further known is a friction-driven roll comprising a stationary roll core, in which the supporting tube is mounted for rotation on the core with the interposition of both anti-friction bearing and distension bodies, and has an elasticity bending jacket. In this prior art design, the supporting tube is sub-divided into drums, with the length of each drum corresponding to the spacing of the antifriction bearings or distension bodies. Already for this reason, only a relative coarse correction of the flexure can be obtained. Further, the supporting tube at the same time performs the function of the jacket tube and must therefore be relatively thick-walled, alrady for stability reasons. Such a supporting or jacket roll is little elastic and requires a counter-roll of a relatively large outer diameter, so that it is difficult to obtain a high specific gap pressure such as required for improving the squeezing effect (see British Pat. No. 1135901).

SUMMARY OF THE INVENTION

The invention is directed to a friction-driven roll constructed so as to make it possible to differentiate the correction of the flexure over the entire length of the roll and to improve the effect of squeezing.

In accordance with the invention there is provided a friction-driven roll which includes a stationary roll core and a supporting tube disposed over the roll core and a jacket tube rotatably mounted on a supporting tube. A plurality of elastic distension bodies are disposed between the roll core and the supporting tube and antifriction bearings are arranged between the supporting tube and the jacket tube. The supporting tube comprises a plurality of link sleeves arranged end to end with a joint therebetween and with a coupling sleeve embracing each two adjacent link sleeves and the joints therebetween. The distension bodies comprise hollow fluid pressure cushions which are supplied with fluid under pressure from individual fluid pressure supply lines.

The invention thus teaches that the supporting tube is composed of tubular sections which are linked to one another by a kind of universal joints and, therefore, movable in any direction relative to each other. For this reason, the laterally arranged measure cushions disposed between the supporting tube and the fixed roll core can be used, upon a corresponding application of fluid pressure, not only for lifting and lowering the jacket tube relative to the counter-roll, but also for correcting the flection along the entire length of the jacket tube. The adjustable pressure acts through the supporting tube which is designed as a flexible, articulate tube. The jacket tube is supported substantially directly, and over its entire length, by the flexible articulate tube and by the antifriction bearings, and therefore, it can be designed with a relatively small outer diameter and a relatively thin wall, and becomes thus highly elastic. This high elasticity enables the inventive roll to easily conform to the flexure of a conventional counter-roll, while forming a constantly uniform roll gap. Consequently, with an equal gap pressure, the counter-roll may bend more within the span of the roll, and have a smaller diameter than hitherto. This again permits higher gap pressures and improved squeezing effects.

Due to the smaller wall thickness of the jacket tube, and the design of the supporting tube as a flexible, articulate tube, the total moment of inertia of the inventive friction-driven roll is reduced and the motion of the roll is easier started and braked. Further, a friction-driven roll is obtained in which the jacket tube can be bent in advance without applying an outer force, and in conformity with the pressure distribution to be expected in the roll gap, since the gap pressure can selectively be varied over the entire length of the roll. While passing through webs having thicker portions, overlapping areas, seams, etc., the gap pressure increases only slightly if the distension bodies are pressurized pneumatically. These are the substantal advantages of the invention.

The technological effect obtained with the invention is optimized in a preferred embodiment important of itself, by providing that the jacket tube is assembled of ring members provided with aligned circular grooves and with elastic restoring rings arranged between the ring members. The elasticity of the jacket tube and, consequently, the conforming capability of the inventive friction-driven roll is thereby further augmented. In consequence, the counter-roll may bend to an unusual extent and the uniformity of the roll gap will still be preserved. The result of this design with an articulate jacket tube is that still stronger differential pressures than before can be produced in the roll gap along the entire length of the roll. The total squeezing effect thereby obtained is further improved. The restoring rings provide for the required stability in shape of the articulate jacket tube. In fact, upon removing the load, the articulate jacket tube assumes its cylindrical shape again. To minimize the polygonal effect of the trail of assembled ring members, the width of these members is selected to be a function of the diameter and length of the articulate jacket tube.

The invention provides that the restoring rings are inserted in corresponding grooves of adjacent ring members. The restoring rings may be made of rubber, of a rubber-elastic plastic, or designed as undulated spring rings. In instances where the jacket tube is provided with a rubber-elastic coating, it is advisable to provide that the jacket tube is incorporated into the coating under an initial axial tension. In other words, the ring members are coated with rubber and vulcanized while being axially prestressed. In this way, an additional restoring effect is obtained through which the stability and shape is increased and the restoring of the jacket tube to its cylindrical shape is supported. To summarize, the distinguishing property of the inventive friction-driven roll is that it can cooperate under conditions of extremely high gap pressures with an extremely small counter-roll which is extremely flexed up to the limit of loading capacity.

Further features substantial to the invention may be enumerated as follows:

At the ends of the supporting tube, thrust bearings may be provided for the rotary jacket tube, preventing an axial displacement of the jacket tube on the supporting tube. The link sleeves and coupling sleeves are connected to each other, in accordance with the invention and in a simple manner, by means of radial joint pins. The antifriction bearings are advantageously designed as relatively flat needle cage roller bearings.

A preferred embodiment of the invention provides that the pressure cushions are closely arranged longitudinally and circumferentially of the core. The pressure cushions may be made from a reinforced elastomer or from metal diaphragms. In any case, they are intended for being pressurized pneumatically or hydraulically, and for moving the jacket tube, namely pressing it toward the counter-roll, while ensuring a definite gap pressure, opening the roll gap, and giving the jacket tube an initial bent shape while taking into account a corresponding fluid pressure. For this purpose, each pressure cushion is provided with a pressure fluid supply of its own.

Accordingly, it is an object of the invention to provide a friction-driven roll which comprises a stationary roll core, a supporting tube disposed over the roll core and a jacket tube rotatably mounted on the supporting tube with a plurality of elastic distension bodies disposed between the roll core and the supporting tube and antifriction bearings disposed between the supporting tube and the jacket tube and wherein the supporting tube comprises a plurality of link sleeves arranged end to end with a joint therebetween and coupling sleeves embracing each two adjacent link sleeves and the joints therebetween and wherein the distension bodies comprise hollow fluid pressure cushions which are supplied with fluid pressure.

A further object of the invention is to provide a friction driven roll which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its use, reference is made to the accompanying drawings and descriptive matter in which preferred embodiments of the invention are illustrated.

BRIEF DESCRIPTION OF THE DRAWINGS

In the drawings:

FIG. 1 is a diagrammatical axial section of an inventive friction-driven roll;

FIG. 2 is a radial sectional view taken along line 2—2 of FIG. 1;

FIG. 3 shows a roll according to FIG. 1, with a counter-roll and a web passing therebetween;

FIg. 4 shows a roll according to FIG. 1 bent in advance; and

DESCRIPTION OF THE PREFERRED EMBODIMENTS

Figure 5:
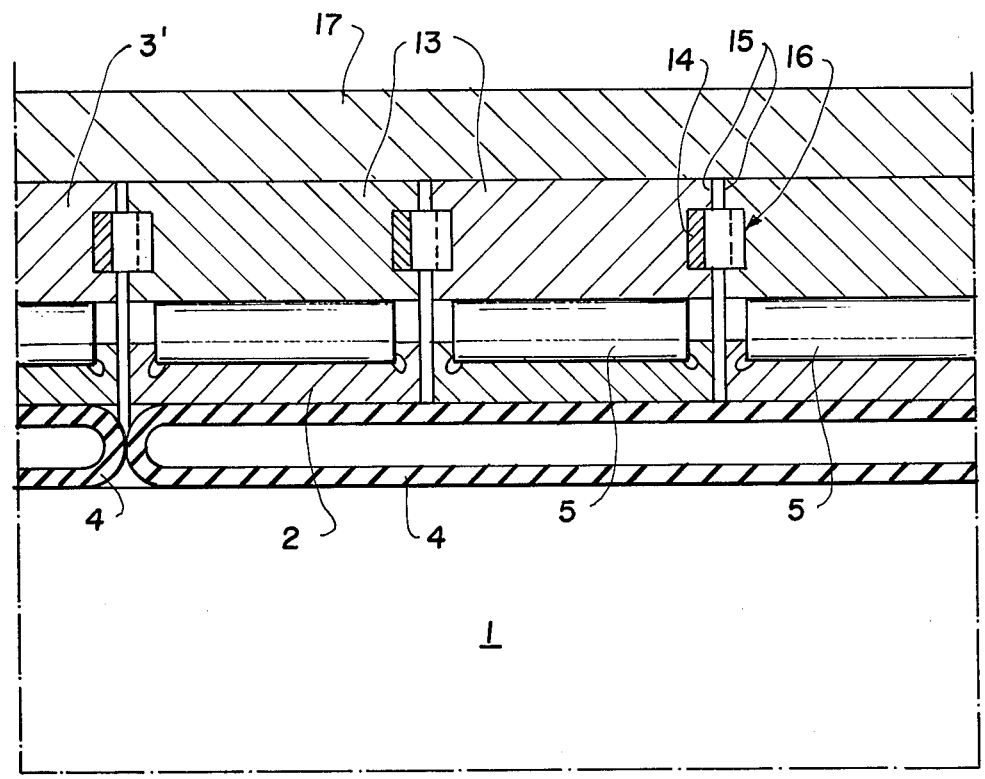
FIG. 5 is a partial axial section of a modified embodiment of a roll in accordance with FIG. 1.

Referring to the drawings, in particular the invention embodied therein, comprises a friction-driven roll which includes a stationary roll core 1, a supporting tube 2 disposed over the roll core 1 and a jacket tube 3 rotatably mounted on a supporting tube 1. A plurality of elastic distension bodies 4 are disposed between the roll core 1 and the supporting tube 2, antifriction bearing means in the form of individual roller bearings 5 are arranged between the supporting tube 2 and the jacket tube 3. Supporting tube 2 comprises a plurality of link sleeves 6 arranged end to end with a joint are between adjacent pairs of sleeves and a coupling sleeve 8 embracing each two adjacent link sleeves and the areas therebetween. The distension bodies 4 advantageously comprise hollow fluid pressure cushions which are connected separately through pressure fluid supply connections 9 through a fluid pressure supply.

The figures show a friction-driven roll for treating web-like intermediate or semi-manufactured products by compression, substantially comprising a stationary roll core 1, a supporting tube 2 surrounding the roll core and a jacket tube 3 mounted for rotation on the supporting tube 2. Distension bodies 4 are disposed between roll core 1 and supporting tube 2. Between the supporting tube 2 and the jacket tube 3, antifriction bearings 5 are provided. Supporting tube 2 is designed as a flexible articulate tube assembled of a plurality of linked sleeves 6 and of coupling sleeves 8 embracing them and bridging the joints thereof. The antifriction bearings 5 are received on linked sleeves 6, between coupling sleeves 8. The distension bodies are designed as pressure cushions 4 which are distributed over the length and circumference of the core in the manner of separate segments, for being kept in inflated state pneumatically or hydraulically. At the ends of supporting tube 2, thrust bearings 10 for jacket tube 3 are provided. Link sleeves 6 and coupling sleeves 8 are connected to each other by radially extending joint pins 11. Antifriction bearings 5 are designed as needle cage roller bearings. Pressure cushions 4 are disposed at closely adjacent locations both longitudinally and circumferentially of the core, while forming distension rings. Preferably, one such distension ring is formed by four pressure cushions arranged at 90° centers or three of 120°, or two of 180°, for example. Each pressure cushion 4 has a pressure fluid supply connection 9 of its own. The respective supply conduits 12 are provided within the stationary roll core 1. Optionally, however, the individual pressure cushions 4 may be supplied through conduits common to a plurality of cushions.

In accordance with a preferred embodiment of the invention, the pressure cushions 4 at the top side of roll core 1 are provided in the central region thereof, while the pressure cushions 4 at the bottom side of roll core 1 are provided in the external or marginal zones of the core. This may give support to the flexure of the friction-drive roll and help to conform it to a very thin counter-roll.

According to a further preferred embodiment as shown in FIG. 5, jacket tube 3' is subdivided into ring members 13, and elastic restoring rings 14 are provided between ring members. For this purpose, the abutting end faces or ends 15 of ring members 13 are provided with aligned circular grooves 16, and the restoring rings 14 are received in the annular cavities thus formed. Rubber rings or undulated spring rings may be employed as the restoring rings 14. In instances where the articulate jacket tube 3' is provided with a rubber-elastic coating 17, the coating with rubber and vulcanization will be carried out while exposing the jacket tube or its ring members 13, with the restoring rings 14 received in the cavities, to an axial prestressing force, so that an additional restoring effect will be obtained.

While specific embodiments of the invention have been shown and described in detail to illustrate the application of the principles of the invention, it will be understood that the invention may be embodied otherwise without departing from such principles.

What is claimed is:

1. A friction-driven roll, comprising a stationary roll core, a supporting tube disposed over said roll core, a jacket rotatably mounted on said supporting tube, a plurality of elastic distension bodies disposed between said roll core and said supporting tube, antifriction bearing means disposed between said supporting tube and said jacket tube, said supporting tube comprising a plurality of link sleeves arranged end to end with a joint area between each adjacent pair of link sleeves, a plurality of coupling sleeves at least embracing each adjacent pair of link sleeves and the joint area between each adjacent pair of link sleeves, and wherein said distension bodies comprise hollow fluid pressure cushions, and a fluid pressure supply connected to said pressure cushions.

2. A friction-driven roll, according to claim 1, wherein said jacket tube comprises a plurality of ring members arranged in end to end relationship and an elastic restoring ring arranged between each two adjacent ring members and connected thereto.

3. A friction-driven roll, according to claim 2, wherein said ring members each having abutting ends with an annular groove defined in each end, said restoring rings between each two rings members within said groove of and bridging between each two ring members.

4. A friction-driven roll, according to claim 3, wherein said restoring ring comprises elastic rings.

5. A friction-driven roll, according to claim 1, including an elastic coating applied over said jacket tube, said jacket tube comprising a plurality of ring members arranged end to end and articulated together.

6. A friction-driven roll, according to claim 1, including thrust bearings arranged at each end of said supporting tube and rotatably supporting said jacket tube.

7. A friction-driven roll according to claim 1, including a radial joint pin connected between each of said link sleeves and at least some of said coupling sleeves.

8. A friction-driven roll, according to claim 1, wherein said antifriction bearing means comprises a needle cage roller bearing.

9. A friction-driven roll according to claim 1, wherein said pressure cushions are arranged in closely spaced longitudinal and circumferential direction.

10. A friction-driven roll according to claim 1, wherein said pressure cushions are disposed in a central zone at the topside of said core and in a marginal zone at the bottom side of said core.

11. A friction-driven roll according to claim 1, wherein said pressure fluid supply is connected separately to each of the pressure cushions.

* * * * *